United States Patent

Schiessle et al.

[11] Patent Number: 4,638,659
[45] Date of Patent: Jan. 27, 1987

[54] DEVICE FOR THE INDIRECT CONTACTLESS ELECTRICAL MEASURING OF SHORT PATHS

[75] Inventors: Edmund Schiessle, Schorndorf; Werner Forkel, Stuttgart, both of Fed. Rep. of Germany

[73] Assignee: Daimler-Benz Aktiengesellschaft, Fed. Rep. of Germany

[21] Appl. No.: 676,848

[22] Filed: Nov. 30, 1984

[30] Foreign Application Priority Data

Nov. 30, 1983 [DE] Fed. Rep. of Germany ....... 3343269

[51] Int. Cl.$^4$ .......................................... G01M 15/00
[52] U.S. Cl. ..................................... 73/119 A; 336/45
[58] Field of Search ................. 73/119 A; 336/45, 77, 336/75, 110; 323/330, 347, 264

[56] References Cited

U.S. PATENT DOCUMENTS

| 3,020,527 | 2/1962 | MacLaren | 336/75 |
| 3,777,255 | 12/1973 | Young et al. | 336/45 |
| 4,362,050 | 12/1982 | Stummpp et al. | 73/119 A |
| 4,362,051 | 12/1982 | Schlagehauf | 73/119 A |
| 4,448,066 | 5/1984 | Romblom et al. | 73/119 A |
| 4,502,326 | 3/1985 | Kaczynski | 73/119 A |

FOREIGN PATENT DOCUMENTS

| 2949705 | 6/1981 | Fed. Rep. of Germany . | |
| 522651 | 4/1955 | Italy | 73/119 A |
| 1256721 | 12/1971 | United Kingdom . | |
| 1382706 | 2/1975 | United Kingdom . | |

Primary Examiner—Stewart J. Levy
Assistant Examiner—Robert R. Raevis
Attorney, Agent, or Firm—Barnes & Thornburg

[57] ABSTRACT

A device is provided for the indirect contactless electrical measuring of short distances, particularly for measuring the stroke and/or the position of nozzle needles for injection nozzles of internal combustion engines. A coil having a solid core of a soft-magnetic alloy is used as magnetic field sensor and a low-mass permanent magnet. The permanent magnet is rigidly connected to a moving control element. The nozzle needle is fixed to the control element. Movement of the permanent magnet in relation to the coil causes a change in the magnetic flux density in the core of the coil and, via the nonlinear function $B=f(H)$ of the mangetization curve, effects a change in the dynamic permeability and consequently in the inductance of the coil. The change in inductance of the coil is converted by a suitable electronic evaluating circuit into a path-analogue signal to determine the distance between the fixed coil and the movable permanent magnet. Thus, movement of the nozzle needle which is fixed in relation to the permanent magnet can be precisely monitored.

15 Claims, 4 Drawing Figures

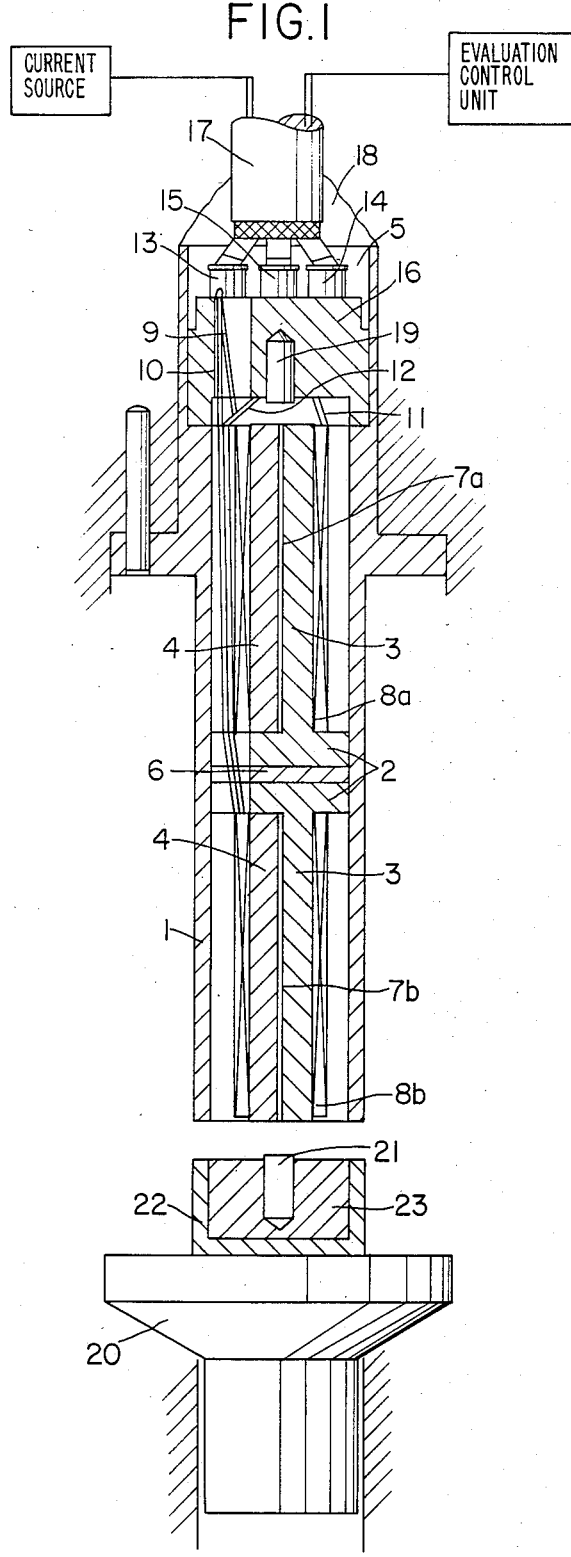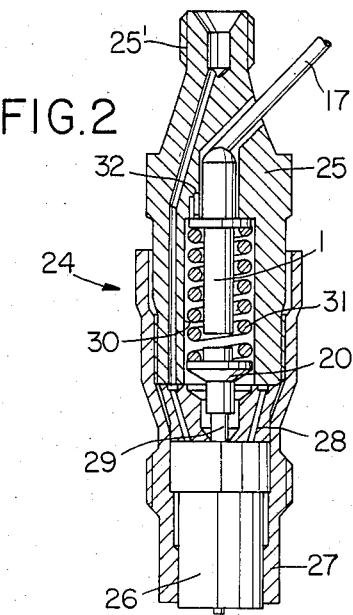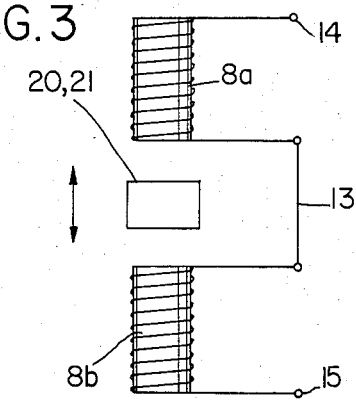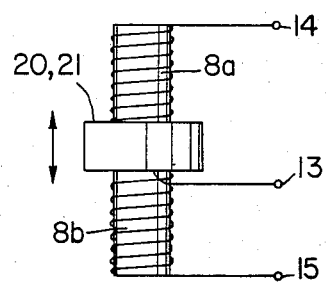

DEVICE FOR THE INDIRECT CONTACTLESS ELECTRICAL MEASURING OF SHORT PATHS

BACKGROUND AND SUMMARY OF THE INVENTION

The invention relates to a device for the indirect contactless electrical measuring of short distances, and particularly to a device for measuring the stroke and/or the position of nozzle needles for fuel injection nozzles of internal combustion engines.

A real-time measurement of the stroke and/or of the position of the nozzle needle of the injection nozzle is required in order to ensure optimum electronic control of the injection of fuel in a diesel motor. Thus, a generic device is known (German Unexamined Published Patent Application No. 2,949,705) in which a control element, which consists of soft-magnetic material and is moved by the nozzle needle and serves as coil core, is displaced in an excited differential coil that is concentrically fixed with respect to the latter. The differential coil, which consists of two coil portions, is here connected as a halfwave bridge. The inductive voltage in one coil portion changes with a movement of the nozzle needle, is picked up as bridge voltage between the two coil portions, and is fed to a second halfwave bridge located in an electronic control unit where it is correspondingly evaluated as a measure of the path travelled by the nozzle needle. Apart from the low sensitivity, a disadvantage of this device is the risk that the control element, while serving as coil core, will break off as a result of transverse vibrations or will be destroyed by contact with stationary parts. An advantageous feature, however, is the low temperature-dependence of the measurement.

The same applies to another known device (German Patent No. 1,049,635) in which a coil core pin of soft iron, which is moved by the nozzle needle and is passed through the differential coil consisting of two coil parts, is displaced in the coil and thereby influences the balance of inductance in the coil which is correspondingly evaluated via a measuring bridge.

A device is also known (German Unexamined Published Patent Application No. 2,920,669) which operates with a "Hall" generator. In this arrangement, a small permanent magnet is mounted in the plunger loaded by the nozzle needle, the field of the magnet is detected by a stationary hall generator arranged in the nozzle holder. When the nozzle needle moves, the permanent magnet is moved with respect to the Hall plate which changes the magnetic field passing transversely through the Hall plate, which leads to a change in the Hall voltage. A disadvantageous feature in this device is the low sensitivity of the Hall generator and its temperature dependence. An advantageous feature is the low mass of the permanent magnet to be moved and the absolute contactlessness of the measurement.

One object of the present invention is to provide a device which has both a large operating temperature range and high sensitivity but simultaneously is reliably constructed so that it can meet the requirements particularly of applications in a rough environment (oil, high temperatures, rapidly occurring movements, strong vibrations).

The core of the coil consists of an amorphous alloy which is characterised by low hysteresis and eddy-current losses, high permeability, and low coercive field strength in order to be able to keep the dimensions of the device and the number of coil turns small.

In contrast, the core of the control element consists of either a cobalt-samarium alloy in order to achieve small dimensions and low mass or, of alnico in cases of particularly high demands on the temperature stability of the magnetization. The core of the control element may also be a ferrite material.

The device of the present invention operates to counter temperature effects on the permanent magnetic core parts, the soft magnetic coil core, and the coil itself in optimum manner, and thereby possess a low temperature dependence.

According to the present invention, a device for indirectly measuring a short distance includes a housing having a longitudinal axis, a measurement coil assembly, a control element, and means for detecting a change in the inductance of the measurement coil assembly. The measurement coil assembly includes a first coil having opposite ends, a companion first core of a soft-magnetic alloy, and a measurement face defined by one end of the first coil. The control element includes a permanent magnet and a measurement face defined by the permanent magnet. The control element is movable along the longitudinal axis of the housing to present the measurement face of the control element in axially spaced confronting relation to the measurement face of the first coil such that movement of the permanent magnet in relation to the first coil causes a change in the magnetic flux density in the first core to effect a change in the dynamic permeability of the first core and thereby change the inductance of the coil. The detecting means is operable to recognize a change in the inductance of the first coil to indicate the distance between the measurement face of the control element and the axially spaced apart measurement face of the first coil.

Other objects, advantages and novel features of the present invention will become apparent from the following detailed description of the invention when considered in conjunction with the accompanying drawings.

BRIEF DESCRIPTION OF THE DRAWINGS

FIG. 1 is a view of one embodiment of the device according to the present invention;

FIG. 2 is a view of the device shown in FIG. 1 as installed in an injection nozzle;

FIG. 3 is a diagrammatic view of another embodiment of the present invention; and FIG. 4 is a diagrammatic view of yet another embodiment of the present invention.

DETAILED DESCRIPTION OF THE DRAWINGS

Two identical coil foundations 2 are inserted into a non-magnetic, hollow, cylindrical housing 1. Each coil foundation 2 includes a lower portion 3 joined to a companion upper portion 4. In one embodiment, one coil foundation extends to one end of the housing 1 while the other coil foundation extends to a holding hole 5 formed in the housing 1. The two coil foundations 2 are separated from one another by a ceramic disc 6 situated therebetween. Core portions 7a and 7b of an amorphous alloy is inserted between the upper portion 4 and lower portion 3 of each coil foundation 2. Core portions 7a and 7b are strip-shaped ribbons and extend nearly over the length of the upper portion 4. Cylindrical coils 8a and 8b are wound in the same direction around each coil foundation 2. Coils 8a and 8b are connected in series in such a manner that the winding end 9 of the upper coil 8a is connected to the winding start 10 of the lower coil 8b at a connecting contact 13, to form a center tap. In contrast, the winding start 11 of upper coil 8a is carried to a connecting contact 14 and the winding end 12 of the lower coil 8b is carried to a connecting contact 15. The connecting contacts 13, 14, and 15 are held by a ceramic holder 16 inserted in the holding hole 5 and are kept at a distance from each other. In addition, a connecting cable 17 is attached thereto. Via cable 17, coils 8a and 8b are connected to a preferably constant current source (via connecting contacts 14 and 15) and are connected to an evaluation control unit. The connecting cable 17 and the connecting contacts 13 and 15 are potted with respect to the housing 1 with an insulating compound 18. A permanent magnetic reference magnet 19 is also inserted into the ceramic holder 16 to lie on the center axis of the device at a specified fixed distance to the upper face of the upper coil 8a. The lower face of the lower coil 8b, in contrast, lies in confronting relation to a control element 20 having a permanent magnetic core 21. The magnetic core 21 also lies on the center axis of the device and is held by a ceramic part 23 disposed in a pot-shaped extension 22 of the control element 20. Preferably, the core 21 is constructed to be identical to the reference magnet 19 so that the two have the same characteristics and magnetic magnitudes. In addition, the movable control element 20 is adjusted in its stationary initial position in such a manner that the core 21 is located the same distance from the lower face of the lower coil 8b as the reference magnet 19 is located from the upper face of the upper coil 8a. This differential arrangement of the coils 8a and 8b and their cores 7a and 7b and the permanent magnets 19 and 21 very largely compensates for temperature effects on the permeability and on the magnetic field strength. Since a variation in temperature will affect the permeability and the magnetic field strength of the upper coil 8a, core 7a and permanent magnet 19 to the same degree as that of the lower coil 8b, core 7b, and permanent magnet 21, the difference in inductance that is measured will be relatively stable as the temperature varies. For this reason, the coils are also preferably manufactured of a wire having a low resistance/temperature coefficient.

Movement of the permanent magnetic core 21 of the control element 20 in the axial direction of the device toward or away from the housing 1 primarily causes a change in the magnetic flux density B in the lower soft magnetic coil core 7b of the excited coils 8a and 8b to enable the movement of control element 20 to be detected or the path traveled by the control element to be measured. Due to the non-linear relationship between the magnetic flux density B and the magnetic field strength H, B=f(H) according to the magnetization curve of the coil core material, a change is produced also in the dynamic permeability $\mu(H)=dB/dH$ and, in consequence, a change in the inductance L of the lower part-coil 8b in accordance with the relation $L=\mu(H) \times N^2 \times A/1$, where N is the number of turns of the coil, A is the coil cross-section, and 1 is the coil length. This change can then be indirectly picked up at the lower coil 8b as a measurement value, for example as inductive voltage drop, and fed via the connecting contacts 13 and 15 to an evaluation control unit, constructed as a carrier-frequency measuring bridge, to which the upper coil 8a is also connected as a reference branch via the connecting contacts 13 and 14 and which is used both to generate the carrier frequency needed for exciting the coils and to convert the change in inductance or the measurement value into a value which represents the path of the control element. However, it is also possible to detect and correspondingly evaluate the change directly with a commercially available inductance measuring bridge by comparing the two inductances of the two coils 8a and 8b. The amplitude of the exciting alternating voltage can be advantageously selected to have such a value that the coil cores 7a and 7b are driven into saturation and a distortion occurs in the curve shape of the exciting alternating voltage. Due to the continuous magnetic field of the permanent magnetic core 21, the operating point of the coil cores 7a and 7b on the magnetization curve is shifted, depending on the position of the control element 20 relative to the coil 8b, so that the alternating voltage measured has an asymmetry of amplitude which very sensitively depends on the position of the core 21. This asymmetry can be evaluated in accordance with the familiar principle of the fluxgate magnetometer. As a result of the high sensitivity which can be achieved, the core 21 can be constructed to be particularly small and of light weight so that the movement to be detected is not disturbed.

A preferred embodiment of one practical application of the present invention is shown in FIG. 2.

The housing 1 and the control element 20 are shown without portions broken away in FIG. 2. An injection nozzle 24 essentially consists of a nozzle holder 25, a nozzle body 26, and a cap unit 27 interconnecting the two parts. An intermediate plate 28 is also arranged between the two parts 25 and 26. A nozzle needle shaft 29 of the nozzle needle supported in the nozzle body 26 and the plunger of the injection nozzle 24 project into the intermediate plate. The plunger is constructed as control element 20 and is received in a blind hole 30 in the nozzle holder 25. The housing 1 and its connecting cable 17, leading out of the nozzle holder 25 are arranged in the blind hole 30. A compression spring 31 extends between the housing 1 and the control element 20 (plunger) to pre-stress or bias the plunger against the nozzle needle shaft 29 which causes the latter to press the nozzle needle into its closed position in the valve seat. A fuel supply duct 32, which begins at the connecting piece 25', of the nozzle holder 25, opens into a pressurized space in the lower area of the nozzle body 26. When the nozzle needle is moved, for example when it is opened, the control element 20 and the core 21 arranged in it are moved via the nozzle needle shaft 29 of the nozzle needle against the lower face of the housing 1. Such movement primarily causes the magnetic field of the permanent magnetic core 21 to change the magnetic flux density in the soft magnetic core 7b of the lower coil 8b, which is excited via the connecting cable 17, which, as described, leads to a change in the inductance L of this coil 8b and is correspondingly evaluated as a path analogue.

While, according to FIG. 1, the control element 20 and its permanent magnetic core 21 are arranged below the lower coil 8b in axial direction, according to FIG. 3 it is also possible, within the context of given installation conditions, to arrange the control element so as to be movable in the center between the upper and lower coils 8a and 8b. In addition, it is possible, according to FIG. 4, to construct the permanent magnetic core 21 of the control element 20 as a toroidal magnet and for the coils 8a and 8b to plunge into the hole of this magnet. In this arrangement, where a two-part coil 8a and 8b is used, the toroidal magnet must be arranged centrally with respect to the two coil parts.

From the preceding description of the preferred embodiment, it is evident that the objects of the invention are attained and although the invention has been described in detail, it is to be clearly understood that the same is by way of illustration and example only and is not to be taken by way of limitation. The spirit and scope of the present invention are to be limited only by the terms of the appended claims.

What is claimed is:

1. In a device for the indirect contactless electrical measuring of short paths, particularly for measuring the stroke and/or the position of nozzle needles for fuel injection nozzles of internal combustion engines, the device including an excited cylindrical coil having a measurement face defined by one of the ends of the coil and a control element movable relative to the coil in an axial direction with respect thereto, the improvement comprising:

the coil including a solid core of a soft-magnetic alloy, the control element including a permanent magnetic core such that movement of the permanent magnetic core relative to the measurement face of the coil causes a change in the magnetic flux density in the soft-magnetic core of the coil to effect a change in the dynamic permeability and consequently in the inductance of the coil, wherein the coil includes two separate axially off-set coil portions connected in series to define a center tap, one of the coil portions being remotely situated in relation to the control element and the other of the coil portions being situated in close proximity to the control element intermediate the control element and the remote coil portion, the core includes two portions, each coil portion being provided with a companion core portion, and a reference magnet is situated in space-relation to one end of the coil portion remote from the coil element in the axial direction and at a fixed distance to a face of said remote coil portion.

2. The improvement of claim 1, wherein the core of the coil comprises essentially an amorphous alloy, and the core of the control element consists essentially of one of a cobalt-samarium alloy, a ferrite material, and alnico.

3. The improvement of claim 1, further comprising a core foundation around which the coil is wrapped, the core foundation including a lower portion and an upper portion, and wherein the core is constructed as a strip-shaped ribbon and located between the lower and upper portions of its companion core foundation to extend substantially over the length of the coil.

4. The improvement of claim 1, wherein the coil is produced from a wire having a low resistance/temperature coefficient such that the resistance of the wire does not vary greatly for a variation in temperature.

5. The improvement of claim 1, wherein at least one of the coil portions and the companion core portion thereof is disposed in a non-magnetic, hollow, cylindrical housing, and further comprising a connecting cable for coupling a plurality of winding connections of the at least one of the coil portions to a control unit situated outside of the housing.

6. The improvement of claim 5, further comprising an injection nozzle for use in an internal combustion engine, the injection nozzle having a nozzle needle shaft, a nozzle holder formed to include a hole, the control element being positioned in the hole and elastically spaced away from the housing via a compression spring, the compression spring being installed intermediate the nozzle holder and the nozzle needle shaft to yieldably urge the nozzle needle shaft toward a nozzle-closing position.

7. The improvement of claim 1, wherein the control element is situated between the two coil portions.

8. The improvement of claim 7, wherein the permanent magnetic core is a toroidal magnet having a central aperture to slidably receive the coil therein.

9. The improvement of claim 1, wherein the permanent magnetic core is a toroidal magnet having a central aperture to slidably receive the coil therein.

10. A device for indirectly measuring a short distance, the device comprising:

a housing having a longitudinal axis, a measurement coil assembly including a first coil having opposite ends, a companion first core of a soft-magnetic alloy, and a measurement face defined by one of the ends of the first coil, a control element including a permanent magnet and a measurement face defined by the permanent magnet, means for supporting the control element for rectilinear movement along the longitudinal axis of the housing to present the measurement face of the control element in axially spaced confronting relation to the measurement face of the first coil such that movement of the permanent magnet in relation to the first coil causes a change in the magnetic flux density in the first core to effect a change in the dynamic permeability of the first core and thereby change the inductance of the coil, means for detecting a change in the inductance of the first core to indicate the distance between the measurement face of the control element and the axially spaced apart measurement face of the first core, a reference coil assembly including a second coil having opposite ends, a companion second core of a soft-magnetic alloy, and a reference face defined by one of the ends of the second coil, and a reference magnet fixed in spaced-relation to the reference face of the second core to generate a certain magnetic flux density in the second core.

11. The device of claim 10, wherein said means for detecting a change in the inductance of the first core includes one of a carrier-frequency measuring bridge and an inductance measuring bridge, whereby the distance between said two opposing measurement faces is determined by the detecting means which compares and evaluates the inductances of the first and second coils.

12. The device of claim 10, wherein each coil is produced from a wire having a low resistance/temperature coefficient such that the resistance of the wire does not vary greatly for a variation in the temperature.

13. The device of claim 10, wherein the housing is cylindrical, hollow and made of a non-magnetic material, and the measurement coil assembly, the reference coil assembly, and the reference magnet are disposed in the hollow formed in the housing.

14. The device of claim 13, further comprising means for coupling the pair of coils to said means for detecting a change in the inductance of the first core.

15. The device of claim 10, further comprising an injection nozzle for use in an internal combustion engine, the injection nozzle having a nozzle needle shaft, a nozzle holder formed to include a hole, the control element being positioned in the hole, and bias means in engagement with the control element for yieldably urging a nozzle needle shaft toward a nozzle-closing position.

* * * * *